US010312731B2

(12) United States Patent
Lazo et al.

(10) Patent No.: US 10,312,731 B2
(45) Date of Patent: Jun. 4, 2019

(54) POWERED SHELF SYSTEM FOR INDUCTIVELY POWERING ELECTRICAL COMPONENTS OF CONSUMER PRODUCT PACKAGES

(71) Applicant: WESTROCK SHARED SERVICES, LLC, Norcross, GA (US)

(72) Inventors: Philip Lazo, Mt. Airy, MD (US); David Rankin, Winston Salem, NC (US); Thomas A. Lockwood, Clemmons, NC (US); Steven Cukiernik, Lewisville, NC (US); Greg Tetrault, Winston Salem, NC (US)

(73) Assignee: WestRock Shared Services, LLC, Atlanta, GA (US)

( * ) Notice: Subject to any disclaimer, the term of this patent is extended or adjusted under 35 U.S.C. 154(b) by 346 days.

(21) Appl. No.: 14/695,961

(22) Filed: Apr. 24, 2015

(65) Prior Publication Data
US 2015/0311727 A1 Oct. 29, 2015

Related U.S. Application Data

(60) Provisional application No. 61/983,723, filed on Apr. 24, 2014.

(51) Int. Cl.
*H01F 27/42* (2006.01)
*H01F 37/00* (2006.01)
(Continued)

(52) U.S. Cl.
CPC .............. *H02J 50/10* (2016.02); *H02J 50/40* (2016.02); *H02J 50/70* (2016.02); *H02J 50/90* (2016.02)

(58) Field of Classification Search
CPC . H02J 5/005; H02J 7/025; H02J 17/00; H01F 38/14; B60L 11/182
(Continued)

(56) References Cited

U.S. PATENT DOCUMENTS 5,317,238 A 5/1994 Schaedel
5,376,580 A 12/1994 Kish et al.
(Continued)

FOREIGN PATENT DOCUMENTS

JP 2006210000 8/2006
WO 9602970 2/1996

*Primary Examiner* — Anh Q Tra
(74) *Attorney, Agent, or Firm* — WestRock Intellectual Property Group

(57) ABSTRACT

Certain aspects involve a powered shelf system that can inductively provide power to electrical components of consumer product packages. The powered shelf system can include a housing, a primary inductor, a controller, and a pusher system. The primary inductor can be coupled to or included in the housing. The controller can apply an electrical current to the primary inductor in accordance with a maximum power requirement for the powered shelf system. The applied electrical current can be sufficient to create a magnetic field from the primary inductor that has a minimum field strength at a specified distance from the primary inductor. The minimum field strength can be sufficient to induce a minimum current in a secondary inductor for powering an emitting device that is electrically coupled to the secondary inductor. The pusher system can position the secondary inductor at the distance from the primary inductor.

16 Claims, 14 Drawing Sheets

(51) Int. Cl.
*H01F 38/00* (2006.01)
*H02J 50/10* (2016.01)
*H02J 50/70* (2016.01)
*H02J 50/40* (2016.01)
*H02J 50/90* (2016.01)

(58) Field of Classification Search
USPC ........................................................ 307/104
See application file for complete search history.

(56) References Cited

U.S. PATENT DOCUMENTS

| | | |
|---|---|---|
| 5,408,120 A | 4/1995 | Manabe et al. |
| 5,455,466 A | 10/1995 | Parks et al. |
| 5,510,602 A | 4/1996 | Shober et al. |
| 5,537,126 A | 7/1996 | Frederick et al. |
| 5,545,291 A | 8/1996 | Smith et al. |
| 5,548,282 A | 8/1996 | Escritt et al. |
| 5,583,525 A | 12/1996 | Nekomoto et al. |
| 5,634,835 A | 6/1997 | Wu et al. |
| 5,641,611 A | 6/1997 | Shieh et al. |
| 5,734,254 A | 3/1998 | Stephens |
| 5,736,967 A | 4/1998 | Frederick et al. |
| 5,756,147 A | 5/1998 | Wu et al. |
| 5,793,455 A | 8/1998 | Nakamura |
| 5,861,807 A | 1/1999 | Leyden et al. |
| 5,870,067 A | 2/1999 | Smith |
| 5,904,545 A | 5/1999 | Smith et al. |
| 5,923,544 A | 7/1999 | Urano et al. |
| 5,932,327 A | 8/1999 | Ishihara et al. |
| 5,976,613 A | 11/1999 | Janusauskas |
| 6,040,680 A | 3/2000 | Toya et al. |
| 6,046,543 A | 4/2000 | Bulovic et al. |
| 6,118,426 A | 9/2000 | Albert et al. |
| 6,172,608 B1 | 1/2001 | Cole et al. |
| 6,177,921 B1 | 1/2001 | Comiskey et al. |
| 6,184,651 B1 * | 2/2001 | Fernandez ............... H02J 7/025 320/108 |
| 6,196,141 B1 | 3/2001 | Herron, III et al. |
| 6,203,391 B1 | 3/2001 | Murasko et al. |
| 6,274,508 B1 | 8/2001 | Smith et al. |
| 6,281,038 B1 | 8/2001 | Craig et al. |
| 6,291,896 B1 | 9/2001 | Smith |
| 6,312,304 B1 | 11/2001 | Duthaler et al. |
| 6,316,278 B1 | 11/2001 | Craig et al. |
| 6,339,013 B1 | 1/2002 | Naseem et al. |
| 6,352,940 B1 | 3/2002 | Seshan et al. |
| 6,380,729 B1 | 4/2002 | Smith |
| 6,407,763 B1 | 6/2002 | Kakinuma et al. |
| 6,410,940 B1 | 6/2002 | Jiang et al. |
| 6,417,025 B1 | 7/2002 | Gengel |
| 6,420,266 B1 | 7/2002 | Smith et al. |
| 6,424,088 B1 | 7/2002 | Murasko et al. |
| 6,434,871 B2 | 8/2002 | Conway et al. |
| 6,445,489 B1 | 9/2002 | Jacobson et al. |
| 6,465,969 B1 | 10/2002 | Murasko et al. |
| 6,468,638 B2 | 10/2002 | Craig et al. |
| 6,479,395 B1 | 11/2002 | Smith et al. |
| 6,479,930 B1 | 11/2002 | Tanabe et al. |
| 6,507,989 B1 | 1/2003 | Bowden et al. |
| 6,515,522 B2 | 2/2003 | Inada et al. |
| 6,527,964 B1 | 3/2003 | Smith et al. |
| 6,555,408 B1 | 4/2003 | Smith et al. |
| 6,566,744 B2 | 5/2003 | Gengel |
| 6,583,580 B2 | 6/2003 | Shimoda et al. |
| 6,586,338 B2 | 7/2003 | Smith et al. |
| 6,588,131 B2 | 7/2003 | O'Connell, Jr. |
| 6,590,346 B1 | 7/2003 | Eisenhardt et al. |
| 6,599,769 B2 | 7/2003 | Kondo et al. |
| 6,605,483 B2 | 8/2003 | Victor et al. |
| 6,605,902 B2 | 8/2003 | Shimoda et al. |
| 6,606,079 B1 | 8/2003 | Smith |
| 6,606,247 B2 | 8/2003 | Gengel et al. |
| 6,611,002 B2 | 8/2003 | Weeks et al. |
| 6,623,579 B1 | 9/2003 | Smith et al. |
| 6,624,569 B1 | 9/2003 | Pennaz et al. |
| 6,624,571 B1 | 9/2003 | Toyoyasu et al. |
| 6,635,306 B2 | 10/2003 | Steckl et al. |
| 6,639,578 B1 | 10/2003 | Loxley et al. |
| 6,642,069 B2 | 11/2003 | Armgarth et al. |
| 6,653,157 B2 | 11/2003 | Kondo et al. |
| 6,657,289 B1 | 12/2003 | Craig et al. |
| 6,664,560 B2 | 12/2003 | Emerson et al. |
| 6,665,044 B1 | 12/2003 | Smith et al. |
| 6,680,725 B1 | 1/2004 | Jacobson et al. |
| 6,683,333 B2 | 1/2004 | Kazlas et al. |
| 6,683,663 B1 | 1/2004 | Craig et al. |
| 6,693,384 B1 | 2/2004 | Credelle et al. |
| 6,696,785 B2 | 2/2004 | Shimoda et al. |
| 6,706,959 B2 | 3/2004 | Hamakawa et al. |
| 6,715,901 B2 | 4/2004 | Huang et al. |
| 6,730,990 B2 | 5/2004 | Kondo et al. |
| 6,731,353 B1 | 5/2004 | Credelle et al. |
| 6,761,579 B2 | 7/2004 | Fort et al. |
| 6,799,994 B2 | 10/2004 | Burke et al. |
| 6,802,146 B2 | 10/2004 | Gay et al. |
| 6,803,744 B1 | 10/2004 | Sabo et al. |
| 6,819,304 B2 | 11/2004 | Branson et al. |
| 6,896,543 B2 | 5/2005 | Fort et al. |
| 7,164,255 B2 | 1/2007 | Hui et al. |
| D538,093 S | 3/2007 | Lee |
| 7,233,137 B2 | 6/2007 | Nakamura et al. |
| 7,337,731 B2 | 3/2008 | Mu et al. |
| 7,356,952 B2 | 4/2008 | Maher et al. |
| 7,371,177 B2 | 5/2008 | Ellis et al. |
| D581,380 S | 11/2008 | Derocher et al. |
| D600,233 S | 9/2009 | Birsel et al. |
| 7,626,500 B2 | 12/2009 | Fawcett et al. |
| 7,710,266 B2 | 5/2010 | Belden et al. |
| 7,737,846 B2 | 6/2010 | Belden et al. |
| 7,782,274 B2 | 8/2010 | Manning et al. |
| 7,898,105 B2 | 3/2011 | Greene et al. |
| 7,909,483 B2 | 3/2011 | Jacobs et al. |
| 7,923,938 B2 | 4/2011 | Sokola et al. |
| 7,948,208 B2 | 5/2011 | Partovi et al. |
| 7,971,845 B2 | 7/2011 | Galant et al. |
| 7,992,332 B2 | 8/2011 | Lowenthal et al. |
| 8,009,348 B2 | 8/2011 | Zehner et al. |
| D645,467 S | 9/2011 | Mitsuhashi |
| 8,090,550 B2 | 1/2012 | Ben-Shalom et al. |
| 8,092,251 B2 | 1/2012 | Rosenblatt |
| 8,102,262 B2 | 1/2012 | Irmscher et al. |
| 8,102,275 B2 | 1/2012 | McGuire et al. |
| 8,127,477 B2 | 3/2012 | Lowenthal et al. |
| 8,169,185 B2 | 5/2012 | Sears et al. |
| 8,228,026 B2 | 7/2012 | Johnson et al. |
| 8,413,359 B2 | 4/2013 | Lowenthal et al. |
| 8,558,688 B2 | 10/2013 | Henson et al. |
| 8,665,583 B2 | 3/2014 | Kinsley et al. |
| 8,730,052 B1 | 5/2014 | DePoy |
| 8,739,440 B2 | 6/2014 | Ray et al. |
| 2003/0006681 A1 | 1/2003 | Herron, III et al. |
| 2003/0015787 A1 | 1/2003 | Geissinger et al. |
| 2003/0071832 A1 | 4/2003 | Branson et al. |
| 2003/0227384 A1 | 12/2003 | Sweeney et al. |
| 2004/0136171 A1 | 7/2004 | Patton et al. |
| 2005/0156560 A1 | 7/2005 | Shimaoka et al. |
| 2006/0176350 A1 | 8/2006 | Howarth et al. |
| 2006/0186739 A1 | 8/2006 | Grolnic et al. |
| 2007/0103291 A1 | 5/2007 | Adams et al. |
| 2007/0138923 A1 | 6/2007 | Sokola et al. |
| 2007/0214603 A1 | 9/2007 | Vackar et al. |
| 2007/0236174 A1 | 10/2007 | Kaye et al. |
| 2008/0166965 A1 | 7/2008 | Greene et al. |
| 2008/0202003 A1 | 8/2008 | Sweeney et al. |
| 2009/0008275 A1 | 1/2009 | Ferrari et al. |
| 2009/0159677 A1 | 6/2009 | Yakimov et al. |
| 2009/0160262 A1 * | 6/2009 | Schmidt ............... H01F 27/2847 307/104 |
| 2009/0278493 A1 | 11/2009 | Alden et al. |
| 2010/0201201 A1 | 8/2010 | Mobarhan et al. |
| 2010/0219697 A1 * | 9/2010 | Azancot ............... H01F 38/14 307/104 |

(56) References Cited

U.S. PATENT DOCUMENTS

| | | | | |
|---|---|---|---|---|
| 2011/0018360 A1* | 1/2011 | Baarman | ................ | H02J 5/005 |
| | | | | 307/104 |
| 2011/0132854 A1 | 6/2011 | Berdahl et al. | | |
| 2011/0204009 A1 | 8/2011 | Karan et al. | | |
| 2011/0259953 A1 | 10/2011 | Baarman et al. | | |
| 2011/0259960 A1 | 10/2011 | Baarman et al. | | |
| 2012/0038619 A1 | 2/2012 | Shraga et al. | | |
| 2012/0139484 A1 | 6/2012 | Gunderman et al. | | |
| 2012/0153731 A9 | 6/2012 | Kirby et al. | | |
| 2012/0319645 A1 | 12/2012 | O'Donnell et al. | | |
| 2013/0026981 A1* | 1/2013 | Van Der Lee | ......... | H02J 5/005 |
| | | | | 320/108 |
| 2013/0099587 A1 | 4/2013 | Lou et al. | | |
| 2013/0127253 A1* | 5/2013 | Stark | ................... | A61N 1/3787 |
| | | | | 307/104 |
| 2013/0193846 A1 | 8/2013 | Lowenthal et al. | | |
| 2013/0270922 A1* | 10/2013 | Kato | ....................... | H02J 17/00 |
| | | | | 307/104 |
| 2013/0281160 A1* | 10/2013 | Han | ...................... | H04W 88/02 |
| | | | | 455/566 |
| 2013/0341292 A1 | 12/2013 | Johnson et al. | | |
| 2013/0342022 A1* | 12/2013 | Browning | ................ | G09F 9/30 |
| | | | | 307/104 |
| 2013/0343014 A1 | 12/2013 | Browning et al. | | |
| 2014/0191584 A1* | 7/2014 | Kato | ..................... | H02J 7/0044 |
| | | | | 307/104 |
| 2014/0368163 A1* | 12/2014 | Ho | ......................... | H02J 7/025 |
| | | | | 320/108 |
| 2015/0097441 A1* | 4/2015 | Jung | ...................... | H02J 7/025 |
| | | | | 307/104 |
| 2016/0011276 A1* | 1/2016 | Goma | ................... | G01R 31/00 |
| | | | | 324/764.01 |

* cited by examiner

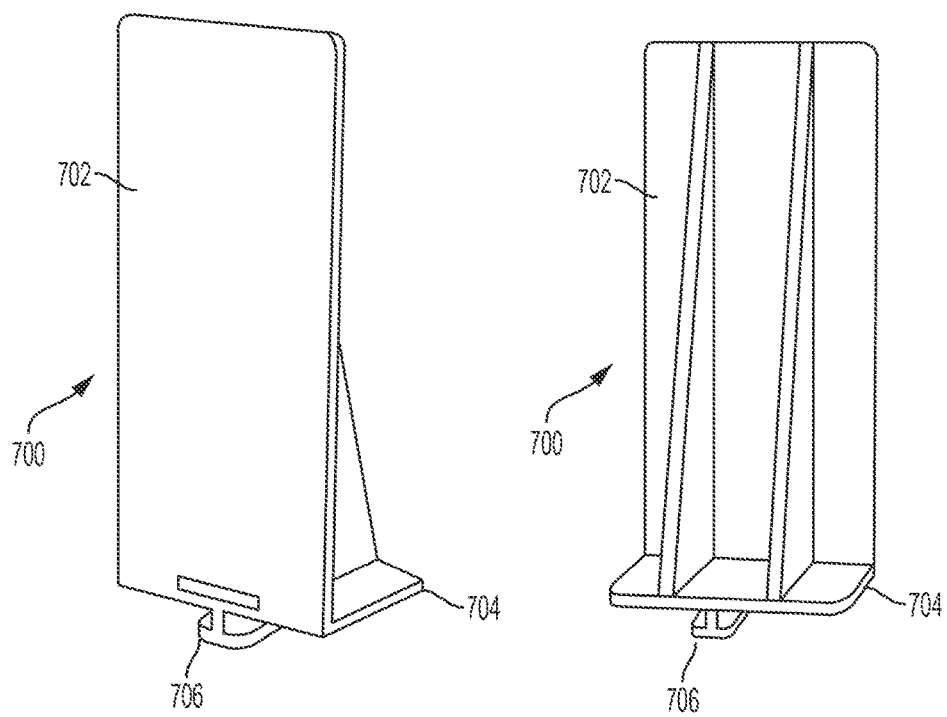

POWERED SHELF SYSTEM FOR INDUCTIVELY POWERING ELECTRICAL COMPONENTS OF CONSUMER PRODUCT PACKAGES

CROSS-REFERENCE TO RELATED APPLICATIONS

This disclosure claims priority to U.S. Provisional Application Ser. No. 61/983,723, filed on Apr. 24, 2014 and titled "Shelving Unit for Inducing Electrical Current in Electrical Components of Consumer Product Packages," the contents of which are incorporated herein by reference.

TECHNICAL FIELD

The present disclosure relates generally to powered shelving for consumer product packages and more particularly (although not necessarily exclusively) to a shelving unit that can induce an electrical current in electrical components of consumer product packages.

BACKGROUND

Consumer product packages sold in stores may include features used to attract potential buyers. For example, such features used to attract potential buyers may include light-emitting devices included in the packaging of a consumer product. For relatively inexpensive products (e.g., toiletries such as toothpaste), it is desirable for such features to be have lower costs associated with production and assembly.

Systems and methods are desirable for efficiently providing small amounts of electrical power to electrical components within consumer product packages.

SUMMARY

Certain aspects and features of the present invention are directed to a powered shelf system that can inductively provide power to electrical components of consumer product packages. For example, the powered shelf system can include a housing, a primary inductor, a controller, and a pusher system. The primary inductor can be coupled to or included in the housing. The controller can be electrically coupled to the primary inductor. The controller can apply an electrical current to the primary inductor in accordance with a maximum power requirement for the powered shelf system. The applied electrical current can be sufficient to create a magnetic field from the primary inductor that has a minimum field strength at a specified distance from the primary inductor. The minimum field strength can be sufficient to induce a minimum current in a secondary inductor for powering an emitting device that is electrically coupled to the secondary inductor. The pusher system can position the secondary inductor at the distance from the primary inductor.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

FIG. 7 is a diagram depicting an example of a pusher that can be used to position a product package with a secondary inductor in alignment with a primary inductor of a powered shelf system according to one aspect of the present disclosure.

FIG. 8 is a diagram depicting an alternative view of the pusher depicted in FIG. 7 according to one aspect of the present disclosure.

DETAILED DESCRIPTION

Aspects of the present disclosure involve a powered shelf system that can induce an electrical current in light-emitting circuitry or other emitting devices within consumer product packages. The powered shelf system can include one or more primary inductors in a housing, a controller for applying an electrical current to the primary inductors, and a pusher system that provides sufficient alignment between the primary inductors and product packages having secondary inductors. The alignment provided by the pusher system can maximize or otherwise improve the energy coupling between a primary inductor in the housing (e.g., the shelf) and a secondary inductor in a product package. Maximizing the energy coupling between the inductors can reduce the amount of energy used by the powered shelf system to power emitting devices in product packaging.

The energy coupling between a primary inductor and a secondary inductor can be maximized or otherwise optimized by using a focused magnetic flux from the primary inductor to the secondary inductor. Focusing the magnetic flux can reduce the power requirements for the powered shelf system. Focusing the magnetic flux can also decrease the risk that energy from a primary inductor will be inadvertently coupled to a device other than a secondary inductor in a product package (e.g., electronic devices in the possession of a shopper).

In some aspects, a powered shelf system can induce an electrical current in light-emitting circuitry or other emitting devices within consumer product packages. For example, a flashing light-emitting diode ("LED") may be added to a product package to attract attention by a shopper. Front-facing products can each have one or more LED's that are visible to a shopper or other viewer. A control circuit or other control device can cause LED's to blink in various patterns to create interest. The control circuit or control device can be used to minimize or otherwise reduce the number of components and/or the amount of wiring within a product package. For example, a burst of energy can be used to make a LED blink or flash.

The subject matter of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
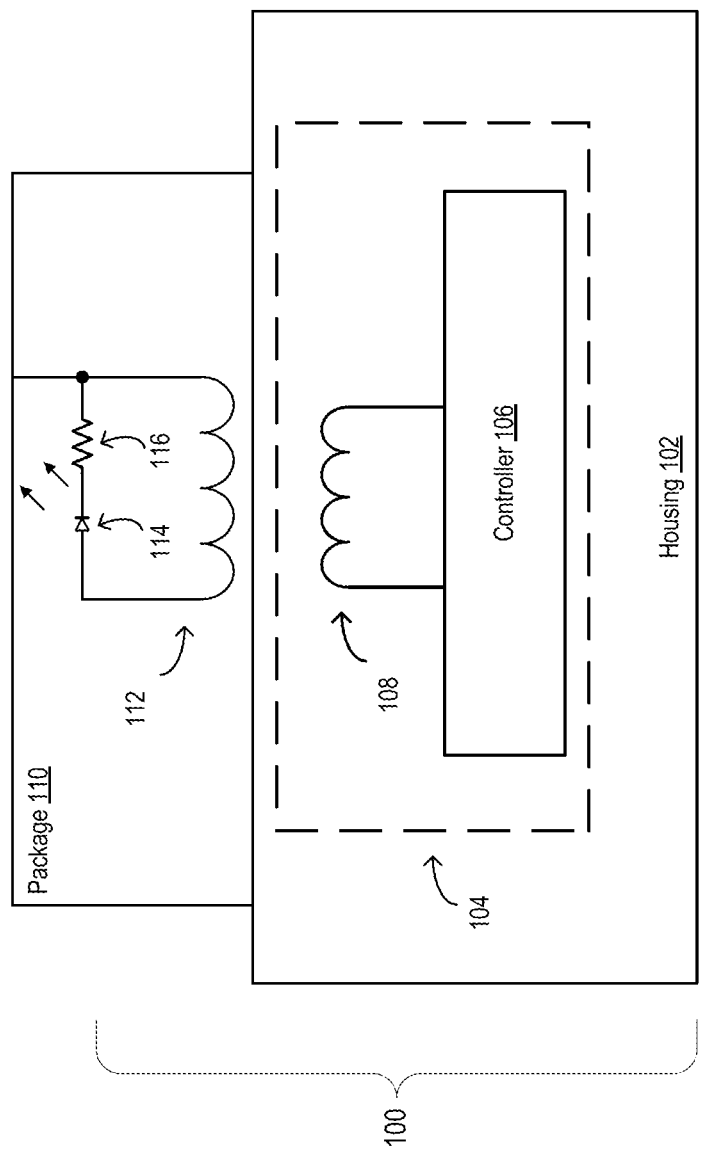
FIG. 1 is a diagram depicting an example of a powered shelf system according to one aspect of the present disclosure.

Referring now to the drawings, FIG. 1 is a diagram depicting a simplified example of a powered shelf system 100 according to one aspect of the present disclosure. The powered shelf system 100 can include a housing 102 and a power system 104. The housing 102 can include, for example, a shelf on which product packages may be displayed. The power system 104 can be integrated with, disposed in, coupled to, or otherwise collocated with the housing 102. The power system 104 can include one or more primary inductors 108 for inducing current in inductive loads, such as a secondary inductor 112 that is integrated with, disposed in, coupled to, or otherwise collocated with a product package 110.

One or more product packages 110 can be positioned on the housing 102. A product package 110 can include illumination circuitry or other emitting devices (e.g., sound emitters, vibrating devices, etc.). The illumination circuitry or other emitting devices can be powered using inductive coupling between the primary inductor in the housing 102 and a secondary inductor 112 in a product package.

The power system 104 can be configured to induce an electrical current in an electrical component of a product package 110 that is positioned on or otherwise supported by the housing 102. For example, a current flow through the primary inductor 108 can induce a corresponding current in the secondary inductor in a product package 110. The induced current can be used to power an emitting device in the product package 110. Non-limiting examples of an emitting device include an LED or other light emitting device, a sound emitting device, a vibrating device, or any other component that can perform one or more activities that may draw attention to the product package.

In the example depicted in FIG. 1, the product package 110 includes or is coupled to the secondary inductor 112, an LED 114, and a resistor 116. The secondary inductor 112 is electrically coupled in series with the LED 114 and the resistor 116. (In some aspects, emitting devices other than an LED and/or current control devices other than a resistor may be used.) The secondary inductor 112 can be oriented inside of the product package 110 such that the secondary inductor 112 is parallel to or otherwise positioned near the primary inductor 108 within the housing 102 on which the product package 110 is positioned. A controller 106 can be used to apply a current (e.g., a pulsating signal) to the primary inductor 108. The current applied to the primary inductor 108 can induce a current within the secondary inductor 112.

A sufficient amount of energy induced in the secondary inductor 112 can configure the LED 114 in a forward conducting state such that light is emitted from the LED 114. For a sufficiently high level of energy in the primary inductor 108 of the power system 104, the LED 114 can emit a bright light. In some aspects, the energy provided to the primary inductor 108 in the power system 104 can be modulated, thereby controlling the relative brightness of the LED 114. Power can be applied to and removed from the power system 104 according to a pattern that causes a variety of flashes to be emitted from the LED 114.

In additional or alternative aspects, the controller 106 can allow the system to be used as part of a product selector. For example, a shopper can engage with a touchscreen to describe his or her needs. Based on input from the shopper (e.g., answering one or more questions via the touch screen), the controller 106 can identify one or more suggest products for the shopper. The controller 106 can cause packages of the selected product(s) to start flashing in such a way that the shopper has no difficulty discerning where a suggested product is located on the shelf.

In some aspects, a printed circuit board with one or more LED's can be fabricated that can be installed inside or on the outside of a product package 110. The printed circuit board can be incorporated into the product package or can be attached to the product package (e.g., an add-on in the form of a sticker). The printed circuit board with one or more LED's can be positioned on a housing 102 on which a front-facing product is to be positioned. The printed circuit board with one or more LED's can include an additional controller that operates the display. The additional controller can configure the LED to flash in a desirable fashion to attract shoppers. The controller can be operated in any suitable manner, such as by using a battery or by electrically coupling the controller to an energy-harvesting power supply.

Devices and processes for implementing a powered shelf system 100 can allow a high-impact product display to be fabricated directly onto product packaging of products positioned on a housing 102. The powered shelf system 100 can use low amounts of energy or otherwise optimize energy usage. For example, a primary inductor 108 may be positioned in the housing 102 such that the energy emitted by the primary inductor 108 can be used to illuminate an LED 114 in a product package 110 positioned in front of other product packages. The distance between the primary inductor 108 and secondary inductors in the other product packages that are not parallel to or otherwise aligned with the primary inductor 108 (e.g., product packages behind a first row) may be too large for the energy emitted by the primary inductor 108 to be used for illuminated LED's in those product packages. Accordingly, little or no energy is wasted on products that are not aligned with the primary inductor (e.g., products not visible to a consumer).

In some aspects, a suitable pusher system can be used to align the primary inductor 108 in the housing 102 with the secondary inductor 112 within a product package 110. The alignment provided by the pusher system can allow for a maximum power transfer or other optimized power transfer from the power system 104 to the product package 110.

In some aspects, the powered shelf system 100 can be configured to provide an efficient energy coupling between the primary inductor 108 and the secondary inductor 112 such that low amounts of energy are used by the powered shelf system. For example, the primary inductor 108 can be selected, positioned, or otherwise configured such that the emission of magnetic energy from the primary inductor 108 is limited to an area directly adjacent to the primary inductor 108. Limiting the electromagnetic field in this manner can focus the electromagnetic field on the profile of the product package 110. A pusher system can align the product package 110 with respect to the primary inductor 108 such that the secondary inductor 112 is positioned within the electromagnetic field emitted by the primary inductor 108.

In some aspects, the magnetic flux associated with the primary inductor 108 can be focused such that a current is induced in the secondary inductor 112 without affecting electronics adjacent to the product package 110. Focusing the magnetic flux can involve decreasing the amount of electrical current provided to a primary inductor 108. In one example, the primary inductor 108 can be aligned with a secondary inductor 112 such that the secondary inductor 112 is positioned entirely within the footprint of the magnetic energy radiated by the primary inductor 108. In another example, the primary inductor 108 can be aligned with a secondary inductor 112 such that the footprint of the magnetic energy radiated by the primary inductor 108 is coextensive with the surface area of the secondary inductor 112 or a surface of the product package in which the secondary inductor 112 is positioned.

The strength of a magnetic field associated with a current flow through a primary inductor 108 can decrease according to a $1/d^3$ relationship, where d is the distance from the primary inductor 108. A pusher system coupled to the housing 102 can position product packages such that the primary inductor 108 is parallel to the secondary inductor 112. The magnitude of a current applied to the primary inductor 108 can be selected such that the resulting magnetic field is sufficient to induce a secondary current in the secondary inductor 112 when the primary inductor 108 is parallel to the secondary inductor 112. The magnitude of the applied current can also be sufficiently low such that the strength of the magnetic field associated with the primary inductor 108 is less than a specified threshold in areas adjacent to the surface of the product package. For example, maintaining a magnetic field strength that is less than a specified threshold can reduce a radiated footprint in compliance with applicable laws or regulations. Maintaining a magnetic field strength below a specified threshold can also prevent damage or malfunctions in products having components that are sensitive to magnetic energy (e.g., products containing sensitive chemistry, products with electrical components, etc.).

In additional or alternative aspects, magnetic flux between the primary inductor 108 and the secondary inductor 112 can be controlled using an appropriate aperture for the primary inductor 108. The magnetic flux associated with the primary inductor 108 can be proportional to the aperture of the primary inductor 108. A primary inductor 108 can be selected for the powered shelf system 100 based on the primary inductor 108 having an aperture sufficient to generate a magnetic field that can be used to power an emitting device in the product package.

The voltage, frequency, and/or current of the energy used by an LED display can vary over a wide range of values without negatively impacting the operation of the LED display. For example, LED's in several devices can withstand a high level of energy for short periods of time if a junction temperature is maintained below 125° C. If the voltage that is applied to the LED exceeds the $V_{forward}$ of the LED, the LED can emit a burst of light. In an example, applying energy of at least 2.0 V at any current level over 5 mA to an LED can illuminate a target LED. An alternating or pulsing voltage signal can be used.

Figure 2:
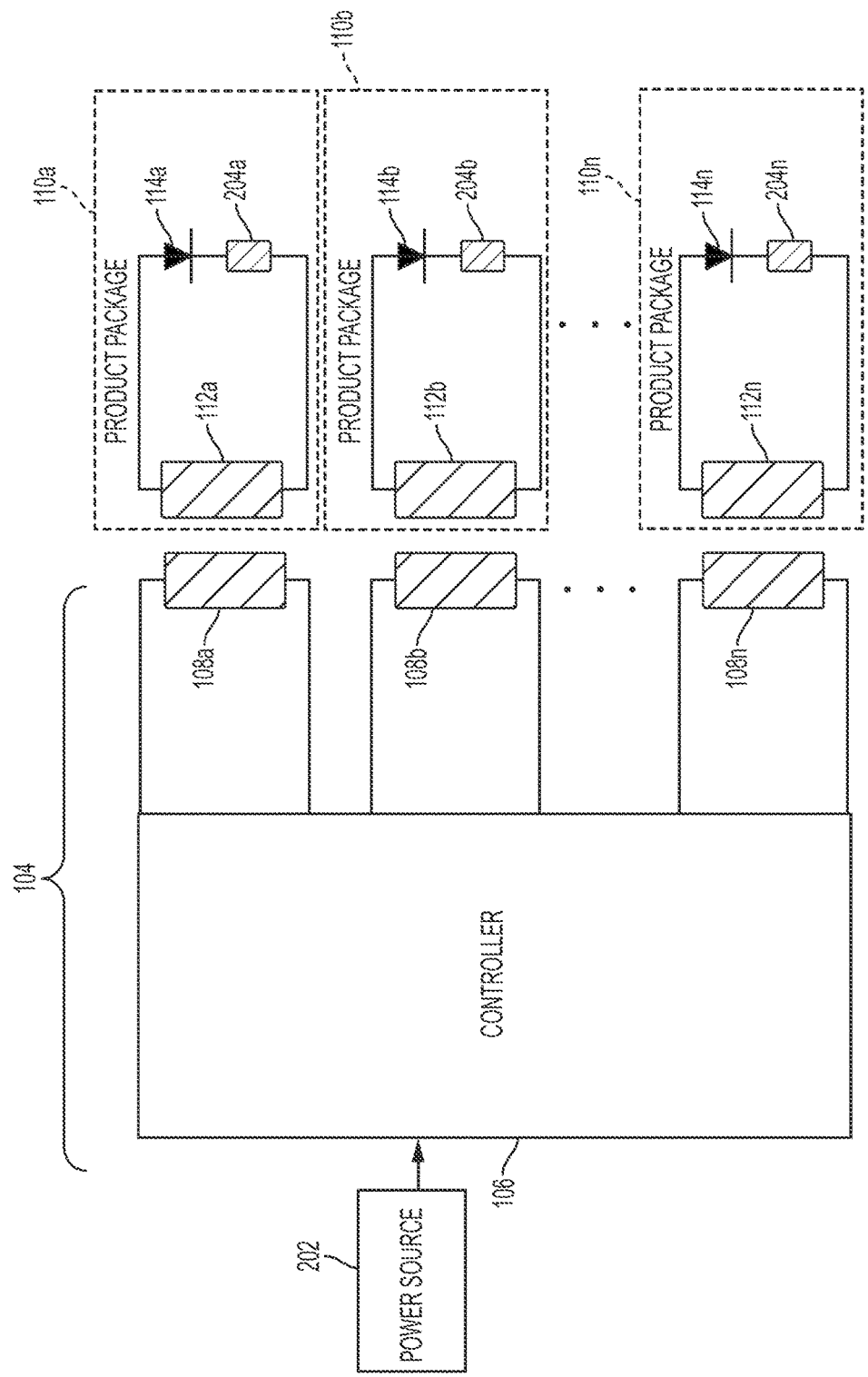
FIG. 2 is a block diagram depicting an example of power system for the powered shelf depicted in FIG. 1 according to one aspect of the present disclosure.

FIG. 2 is a block diagram of a power system 104 for providing power to consumer product packages 110a-n. The power system 104 can include or be electrically coupled to a power source 202. Non-limiting examples of a power source 202 include an electrical power outlet, one or more batteries, one or more power harvesting units, etc. The power system 104 can include a controller 106 and one or more primary inductors 108a-n. The controller 106 can perform one or more operations for inductively generating and/or controlling energy within a product package 110.

As depicted in FIG. 2, the product packages 110a-n include respective secondary inductors 112a-n, respective LED's 114a-n, and respective current limiting components 204a-n. The secondary inductors 112a-n can be electrically connected to the respective LED's 114a-n and the respective current limiting components 204a-n. An example of a current limiting component is a resistor. The secondary inductors 112a-n can be inductively coupled to respective primary inductors 108a-n.

The power source 202 can be used to provide electrical power to the controller 106. Providing the electrical power to the controller 106 can cause current to flow through the primary inductors 108a-n. The current flowing through the primary inductors 108a-n can induce electrical current in the respective secondary inductors 112a-n of the product package 110. The electrical current that is induced in the secondary inductors 112a-n can flow through the respective LED's 114a-n and thereby illuminate the respective LED's 114a-n.

The example depicted in FIG. 2 is provided for illustrative purposes and may differ from other implementations within the scope of this disclosure. For example, although FIG. 2 depicts simplified electrical circuits, each of which includes an inductive coupling component in series with a light-emitting component and a current-limiting component, any suitable electrical circuit can be implemented in the product packages 110a-n.

Although FIG. 2 depicts the product packages 110a-n as including LED's 114a-n, any type of light-emitting component or other emitting device can be included in a product package that may be powered using the powered shelf system 100. For example, low-power sound-emitting devices or vibrating devices can be included in product packaging and powered using the power system 104.

Although FIG. 2 depicts multiple product packages 110a-n that include respective LED's 114a-n, other implementations are possible. For example, a single product package may include multiple LED's 114a-n. The controller 106 can selectively cause subsets of the LED's 114a-n to be activated. Selectively causing subsets of the LED's 114a-n to be activated can provide patterns or sequences of illumination within a product package or a group of product packages 110a-n.

Figure 3:
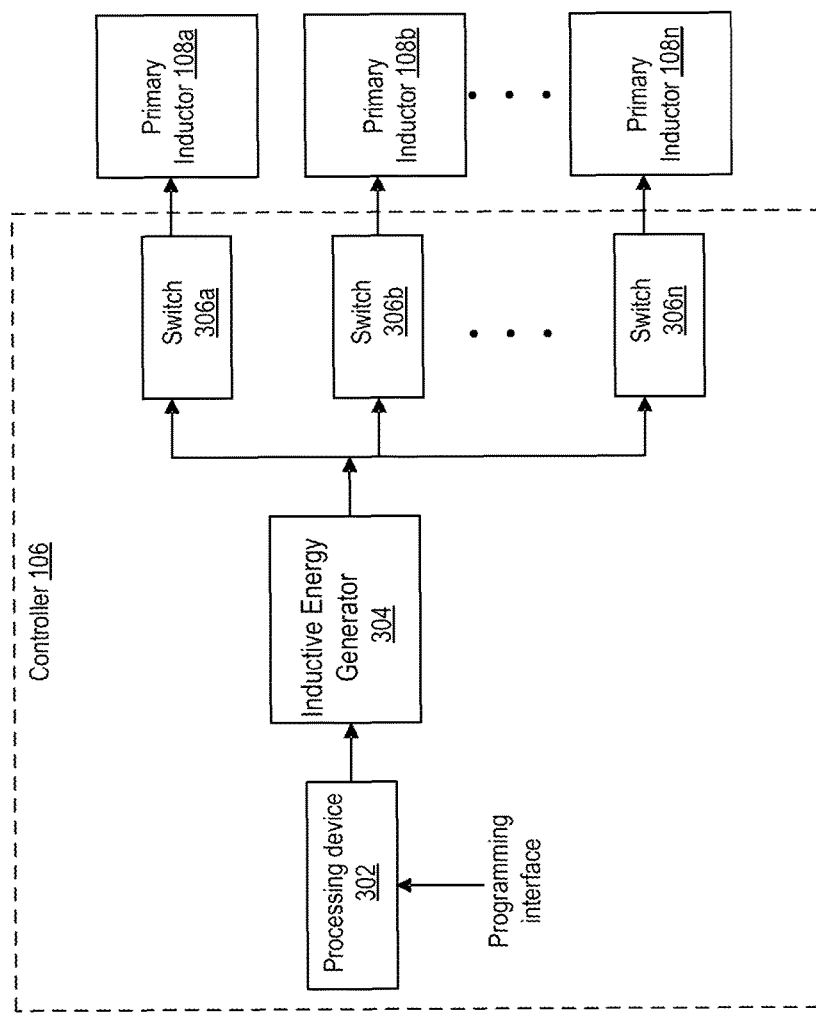
FIG. 3 is a block diagram depicting an example of controller for the power system depicted in FIG. 2 according to one aspect of the present disclosure.

FIG. 3 is a block diagram depicting an example of the controller 106. The controller 106 can include a processing device 302, an inductive energy generator 304, and one or more switches 306a-n.

Examples of the processing device 302 include a microprocessor, an application-specific integrated circuit ("ASIC"), a field-programmable gate array ("FPGA"), or other suitable processor. The processing device 302 may include one processor or any number of processors. In some aspects, the processing device 302 can include or be communicatively coupled with a memory device. The memory device can be a non-transitory computer-readable medium for storing program instructions. The processing device 302 can execute the program instructions stored on the memory device. Executing the program instructions can allow the controller 106 to perform one or more operations for inducing current in the product packages 110a-n or otherwise delivering power in the product packages 110a-n. In additional or alternative aspects, the processing device 302 can be programmed via a suitable programming interface. A suitable programming interface can include an interface circuitry that allows data to be communicated to the processing device 302 (e.g., a universal serial bus interface, a wireless radio interface, etc.).

The inductive energy generator 304 can manage the transfer of power from the power source 202 to the primary inductors 108a-n. For example, the inductive energy generator 304 may include one or more transformers for stepping up or stepping down current and/or voltage in the electrical power provided by the power source 202. The inductive energy generator 304 may additionally or alternative include voltage or current dividers for causing current to be delivered to the primary inductors 108a-n via respective switches 306a-n.

The switches 306a-n can be placed in respective electrical paths via which electrical current is provided to the respective primary inductors 108a-n. The controller 106 can be used to set a given one of the switches 306a-n to an open or closed position. In some aspects, if no product package is positioned near the primary inductor 108a or if it is undesirable to provide power to a product package 110a positioned near the primary inductor 108a, the switch 306a can be set to an open position. For example, LED's behind a front row may not be illuminated because no current is induced in the coils of the product packages. Accordingly, little or no energy is wasted on products behind the front row. Opening the switch 306a can prevent current from being provided to the primary inductor 108a and thereby prevent the product package 110a from being illuminated.

In some aspects, the switches 306a-n can be opened or closed in a sequence. Opening or closing the switches 306a-n in a sequence can cause the LED's 114a-n of the product packages 110a-n to be illuminated in a corresponding sequence, thereby drawing attention to the product packages 110a-n.

In additional or alternative aspects, devices and processes for implementing a housing 102 can be applied to the development of inventory management systems or anti-theft systems. Devices and processes for implementing a housing 102 can also enable higher levels of shopper interaction by, for example, allowing for detection of when a shopper removes a product from the shelf and generating a response in the form of flashing a pattern of lights or playing an audio recording.

In additional or alternative aspects, a suitable device can be used to serially detect the LED diode loads or other load devices that are inductively coupled to the housing 102. For a given package stacking configuration, the serial detection of LED diode loads may be used to detect inventory levels of packages placed on the display.

Figure 4:
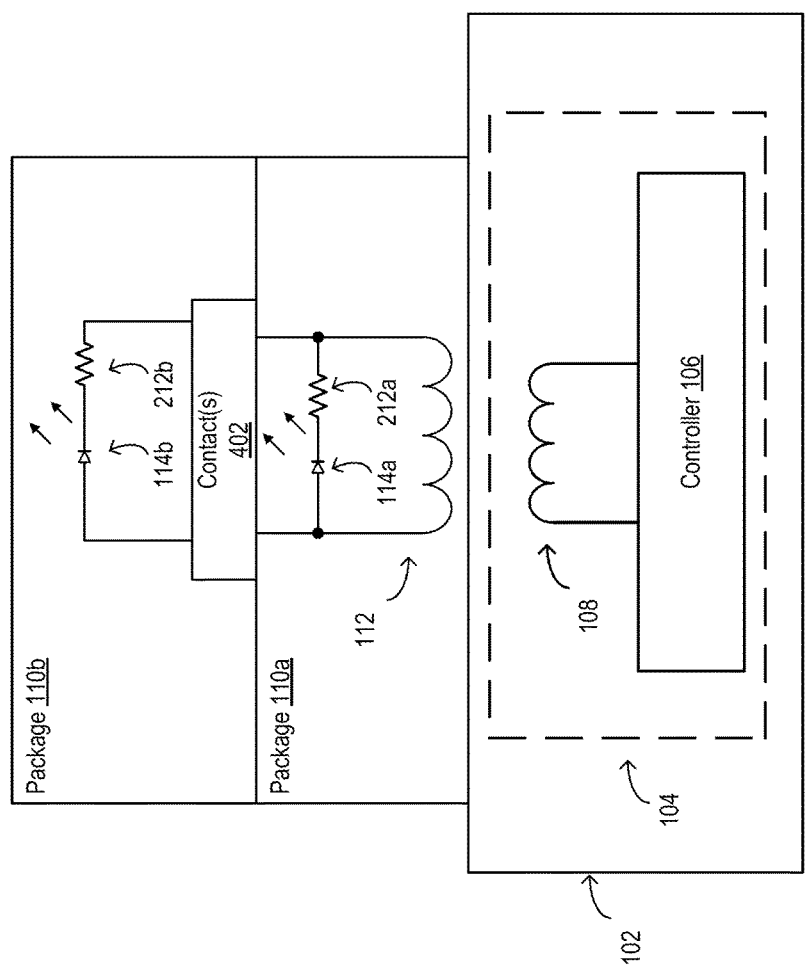
FIG. 4 is a diagram depicting an example of a powered shelf system that can be used for inventory management according to one aspect of the present disclosure.
Figure 5:
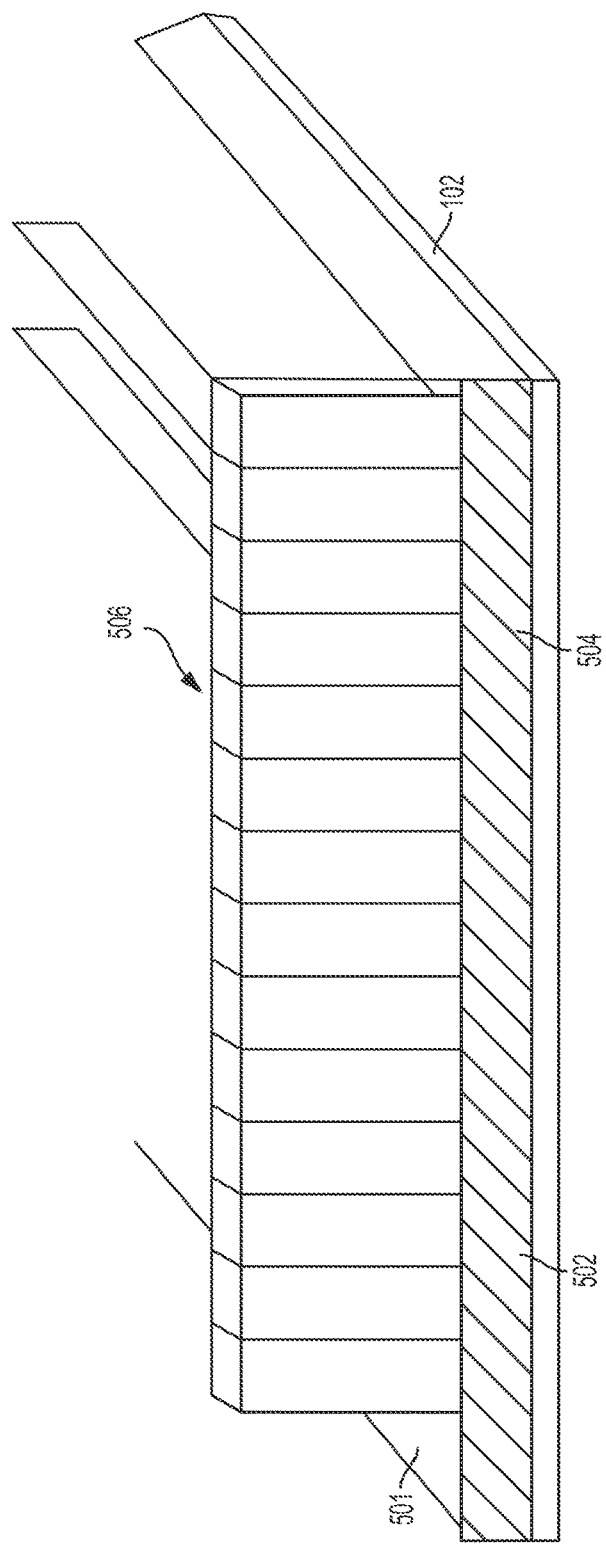
FIG. 5 is a diagram depicting an example of an alternative structure for the powered according to one aspect of the present disclosure.

An example of a system for implementing inventory management is depicted in the partial block diagram of FIG. 4. As depicted in FIG. 4, a product package 110a can be positioned on a housing 102 and a product package 110b can be positioned on top of the product package 110b. The product package 110a can include a secondary inductor 112a, a LED 114a (or other suitable emitting device), and a resistor 116a (or other suitable current limiting component). The product package 110b can include one or more electrical contacts 402, a LED 114b, and a resistor 116b. The electrical contacts 402 can provide direct or inductive electrical contact between the illumination circuitry of the product package 110a and the illumination circuitry of the product package 110b.

The power system 104 can induce current in the secondary inductor 112a. Current induced in the secondary inductor 112a can flow through a first electrical path including the LED 114a and the resistor 116a and through a second electrical path including the LED 114b and the resistor 116b via the contacts 402.

The controller 106 (or another suitable processing device) can determine an amount of current flowing through the first electrical path. The division of current between the first and second electrical paths can reduce the amount of current flowing through the first electrical path. The amount by which the current flowing through the first electrical path is reduced can be proportionate to or otherwise correspond to the division of current between the first and second electrical paths. Thus, the reduced amount of current flowing through the first electrical path can be used by the controller 106 to determine that two product packages 110a, 110b are positioned on the housing 102.

Although FIG. 4 depicts a simplified example in which two product packages 110a, 110b are positioned on the housing 102, the powered shelf system 100 can be used to inventory any number of product packages having circuitry that can be powered using the power system 104. The number of product packages that are positioned on the housing 102 can correspond to an amount of current flowing through the product package in which the power system 104 induces a current.

In some aspects, the housing 102 can include additional features for inducing current at specific locations in a consumer product package. For example, as depicted in FIG.

5, the housing 102 can include a first portion 501 on which a product package 110 is positioned and a second portion 502 that intersects the first portion 501. For example, the portion 502 of the housing 102 may be a paper insert that can integrate a primary inductor 108 or other antenna, a glass panel with a transparent conductive material (e.g., an indium tin oxide), or other suitable structure that can include a primary inductor 108 or other antenna for energizing a corresponding inductive coupling component in the product package 110. The housing 102 can also include a stopper pane 506 that can prevent packages from accidentally sliding off the housing 102.

The portion 502 of the housing 102 can be adjacent to a portion of the product package 110. The primary inductor 108 or other antenna can be embedded in or otherwise disposed at a position 504 within the shelf portion 502. The primary inductor 108 or other antenna embedded in a shelf portion 502 can be used to energize a corresponding secondary inductor 112 or other inductive coupling component in the product package 110. Using a shelf portion 502 to energize an inductive coupling component in the product package 110 can avoid a bend in an inlay that is embedded in the product package 110.

Figure 6:
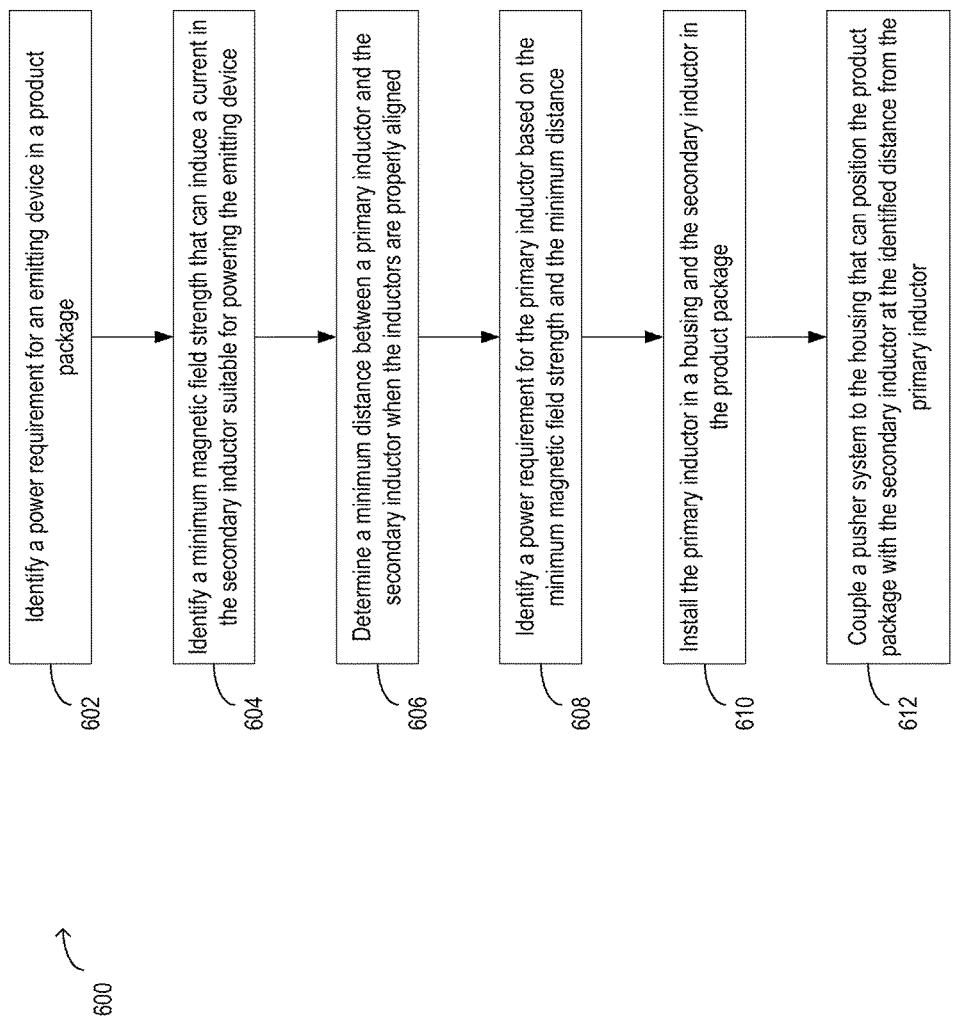
FIG. 6 is a flow chart depicting a method for manufacturing a powered shelf system according to one aspect of the present disclosure.

FIG. 6 is a flow chart that depicts a method 600 for manufacturing a powered shelf system 100. The method 600 is described with respect to the aspects and examples described in FIGS. 1-5 above. However, other implementations are possible.

Block 602 includes identifying a power requirement for an emitting device in a product package 110. The power requirement can indicate a minimum amount of current induced in a secondary inductor 112 that is sufficient for powering the emitting device.

Block 604 includes identifying a minimum magnetic field strength that can induce a current in the secondary inductor 112, where the induced current corresponds to the identified power requirement.

Block 606 includes determining a minimum distance between a primary inductor 108 and the secondary inductor 112 when the inductors are properly aligned. The distance can be identified based on the materials used in the housing 102 and the product packages 110a-c. For example, the type and/or thickness of product packaging and the materials used to construct the housing 102 can determine the minimum distance between the primary inductor 108 and the secondary inductor 112. The minimum distance can be determined for a scenario in which the secondary inductor is positioned in parallel with the primary inductor (e.g., by using a pusher system to align the secondary inductor 112 with the primary inductor 108).

Block 608 involves identifying a power requirement for the primary inductor 108 based on the minimum magnetic field strength identified in block 604 and the minimum distance identified in block 606. The power requirement for the primary inductor 108 can be an amount of electrical current applied to the primary inductor 108 that is sufficient to generate a magnetic field that will have the minimum magnetic field strength at the identified distance between the primary inductor 108 and the secondary inductor 112 when the inductors are properly aligned.

In some aspects, the aperture of an antenna that includes the primary inductor 108 can be designed, selected, or otherwise configured such that the primary inductor 108 provides the minimum magnetic field strength at the identified distance. For example, a maximum power requirement for the primary inductor 108 can be identified (e.g., based on the power available to the powered shelf system 100). The antenna having the primary inductor 108 can be selected or configured with an aperture that is suitable for providing the minimum magnetic field strength when a current less than or equal to the maximum current is applied to the primary inductor 108.

Block 610 involves installing the primary inductor 108 in the housing 102 and the secondary inductor 112 in the product package. In some aspects, installing the primary inductor 108 in the housing 102 involves inserting the primary inductor 108 inside a space within the housing 102. The primary inductor can be secured within the housing using any suitable method (e.g., adhesives, fastening devices, etc.). In other aspects, installing the primary inductor in the housing 102 involves coupling the primary inductor 108 to the housing in a suitable location (e.g., on a first surface of the housing that is parallel and opposite to a second surface of the housing on which a product package will be positioned). Installing the secondary inductor 112 in the product package can involve, for example, inserting the secondary inductor in the product package, attaching the secondary inductor to an outer surface of the product package, or any other suitable operation for manufacturing a product package with electrical components that may be powered using the secondary inductor 112.

Block 612 involves coupling a pusher system to the housing 102 that can position the product package with the secondary inductor 112 at the identified distance from the primary inductor 108. The pusher system can be coupled to the housing 102 in any suitable manner (e.g., adhesive, fastening devices, etc.).

In some aspects, manufacturing a powered shelf system 100 can also include coupling a magnetic flux concentrator to the housing 102. The magnetic flux concentrator can focus the magnetic flux from the primary inductor 108 to the secondary inductor 112. The magnetic flux concentrator can be coupled to the housing 102 in any suitable manner (e.g., adhesive, fastening devices, etc.).

In additional or alternative aspects, manufacturing a powered shelf system 100 can also include applying a ferrite material to a surface adjacent to an area for the product package. The ferrite material can focus the magnetic flux from the primary inductor to the secondary inductor. In some aspects, the ferrite material can be applied to a surface of the housing 102, such as a stopper that is used to prevent product packages 110a-c from falling off of a shelf defined by the housing 102. In additional or alternative aspects, the ferrite material can be applied to a surface of a pusher from the pusher system, such as the pusher depicted in FIGS. 7 and 8.

FIGS. 7 and 8 is a diagram depicting an example of a pusher 700 that can be used to position a product package 110 with a secondary inductor 112 in alignment with a primary inductor 108 of a powered shelf system 100. The pusher 700, depicted in a perspective view in FIGS. 7 and 8, has a first surface 702 and a second surface 704 that is perpendicular to the surface 702. A portion 706 of the pusher 700 is positioned in a slot. A spring can exert a force on the portion 706 in the direction of the primary inductor 108. The force exerted by the spring can cause the surface 702 to apply a force to the product packages 110a-c in the direction of the primary inductor 108. The force applied to the product packages 110a-c can cause the product package 110a to be positioned such that the secondary inductor 112 is aligned in parallel with the primary inductor 108.

Figure 9:
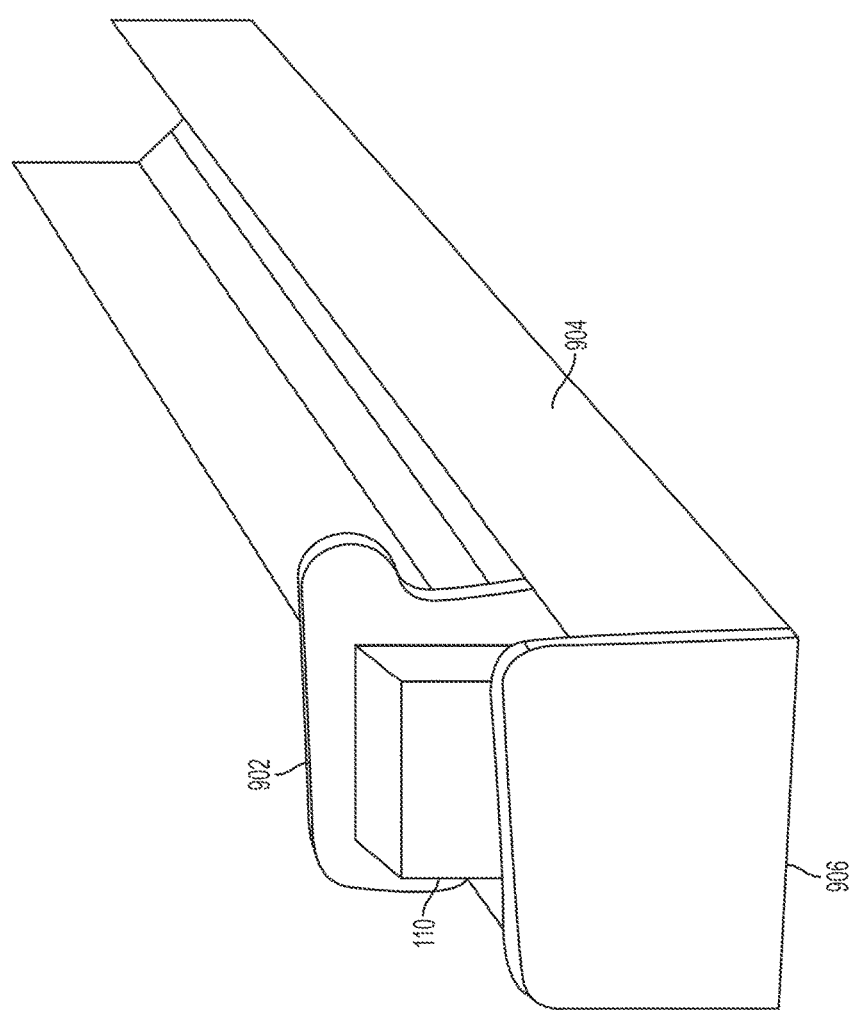
FIG. 9 is a diagram depicting an example of a pusher system according to one aspect of the present disclosure.

FIG. 9 is a diagram depicting an example of a pusher system. The pusher system depicted in FIG. 9 includes a pusher 902, a pusher tray 904 (which can include or be coupled to the housing 102 depicted in FIG. 1), and a stopper 906. The pusher 902 can include any suitable structure, such as the paddle depicted in FIG. 9 or the structure depicted for the pusher 700 in FIGS. 7-8. One or more product packages 110 can be positioned in the pusher tray 904 between the pusher 902 and the stopper 906.

A biasing component (e.g., a spring) or biasing mechanism (not depicted) can be positioned adjacent to the pusher 902. The biasing component or mechanism can exert a force on the pusher 902 in the direction of the stopper 906. Any suitable biasing component or mechanism can be used. For example, the expansion or the tension of a spring can exert the force on the pusher 902 in the direction of the stopper 906.

In some aspects, the pusher system depicted in FIG. 9 can be positioned on or coupled to the housing 102 depicted in FIG. 1. In additional or alternative aspects, the pusher tray 904 can be integral with or otherwise coupled to the housing 102, and the power system 104 can be included with the housing 102 as described above.

In some aspects, the efficiency of the power transfer from the primary inductor 108 to the secondary inductor 112 in the product package 110 can be improved by increasing the amount of magnetic flux between the primary inductor 108 and the secondary inductor 112. For example, a ferrite material can be used to increase the amount of magnetic flux coupling from the primary inductor 108 to the secondary inductor 112. In some aspects, a ferrite material can be applied to the front paddle (e.g., the surface 702 in FIG. 7) of a pusher for each facing. In other aspects, a housing of a powered shelf system can include a front plastic plate with a ferrite material. For example, a ferrite material can be applied to the stopper 906 depicted in FIG. 9. In other aspects, a ferrite trace can start from the front plastic plate of the display, proceed along the bottom shelf of the display, and connect to the front paddle of the pusher for each facing in the display. The structure can provide a pseudo-toroidal transformer structure between the primary inductor 108 and the secondary inductor 112.

In additional or alternative aspects, the powered shelf system 100 can include a magnetic flux concentrator. In the absence of a concentrator, the magnetic flux generated when a current flows through the primary inductor 108 can spread around the primary inductor 108. A magnetic flux concentrator can provide a magnetic path to channel the magnetic flux generated by the primary inductor 108 toward a specified area. A housing 102 and/or a pusher system included in or coupled to the housing 102 can position the product package 110 such that the secondary inductor 112 is positioned in the specified area. The magnetic flux concentrator can be a ferroelectric rod or other suitable device that is positioned near a display that includes the powered shelf system 100. The magnetic flux concentrator can focus a magnetic field that is generated by current flowing through the primary inductor 108. The magnetic flux concentrator can focus the magnetic field toward a specific product package 110. Focusing the magnetic field toward a specific product package 110 can allow for a more flexible arrangement of the product packages on the housing 102.

Figure 10:
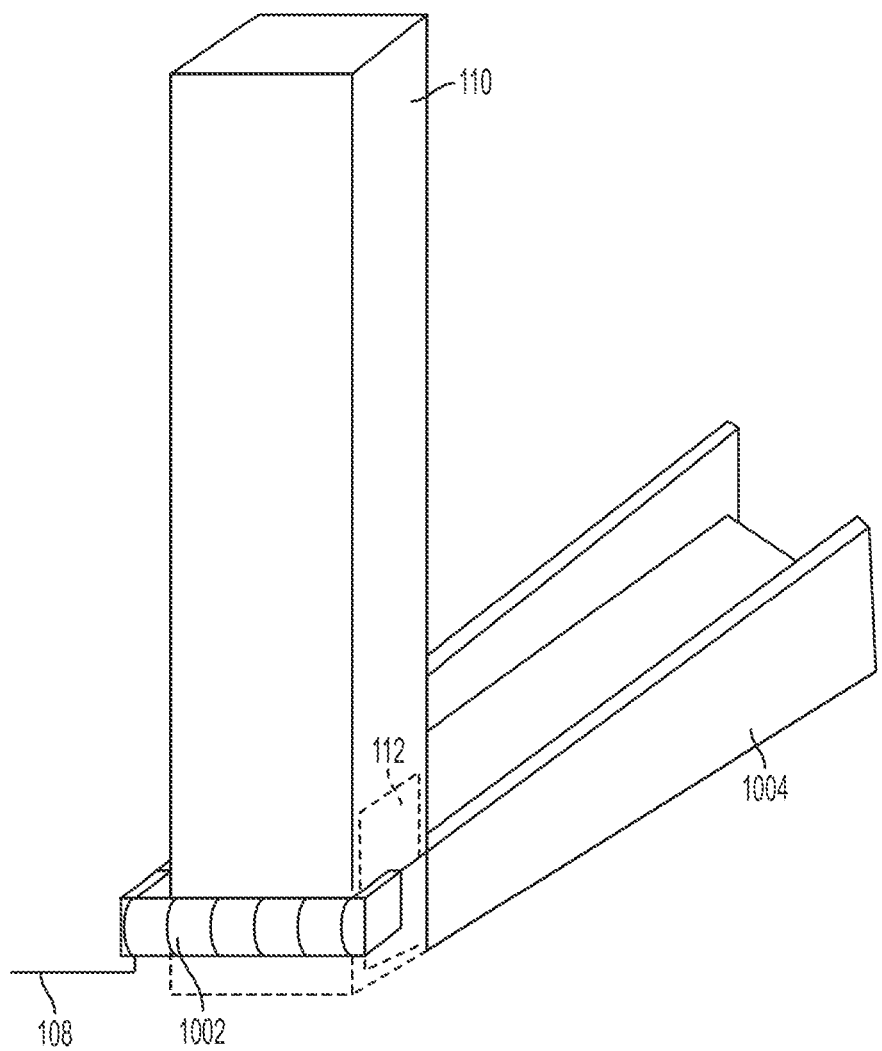
FIG. 10 is a perspective view depicting an example of a powered shelf system with a magnetic flux concentrator that can be used to increase the magnetic flux between a primary inductor and a secondary inductor according to one aspect of the present disclosure.
Figure 11:
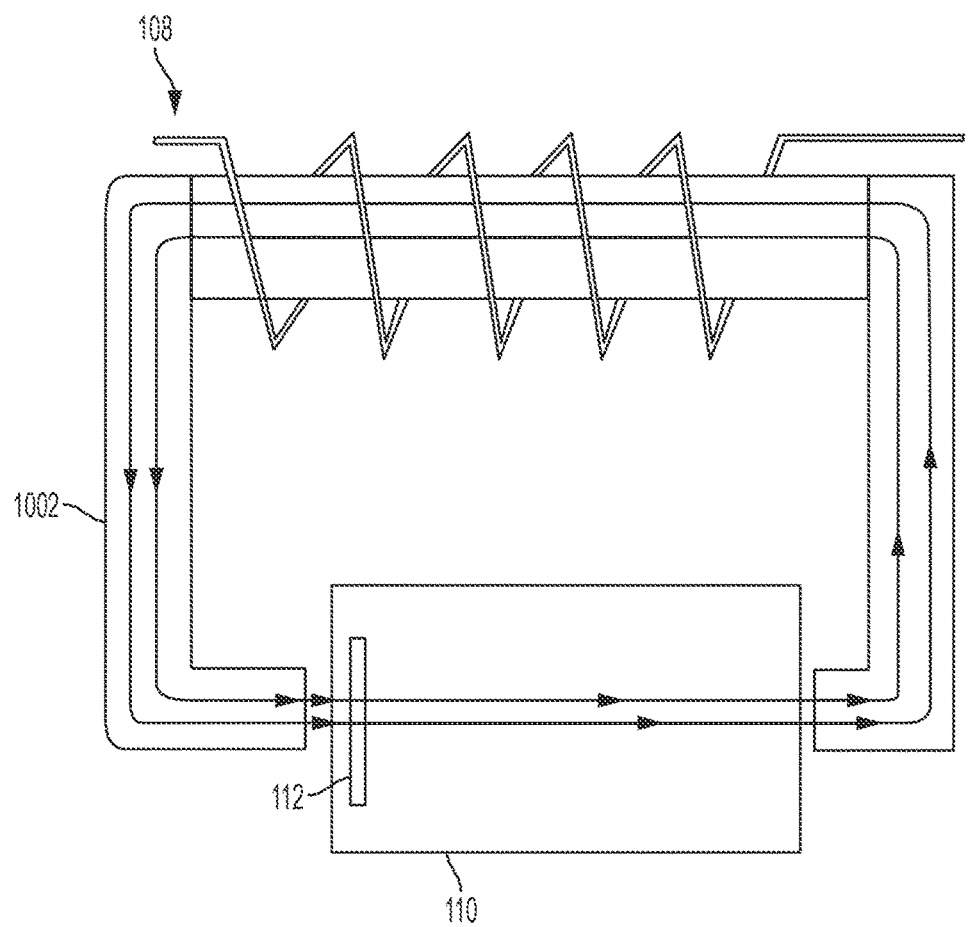
FIG. 11 is a lateral view depicting the powered shelf system of FIG. 10 according to one aspect of the present disclosure.

FIGS. 10 and 11 are diagrams depicting an example of a powered shelf system with a magnetic flux concentrator that can be used to increase the magnetic flux between a primary inductor and a secondary inductor. As depicted in the perspective view of FIG. 10, the powered shelf system can include the primary inductor 108, the secondary inductor 112, a magnetic flux concentrator 1002, and the housing 1004.

The product package 110 can be supported by a housing 1004, which can include or be coupled to the housing 102 depicted in FIG. 1. For example, the housing 1004 depicted in FIG. 10 defines a tray or shelf on which the product package 110 can be positioned.

The magnetic flux concentrator 1002 can be coupled to the housing 1004 in any suitable manner. As depicted in the lateral view of FIG. 11, the primary inductor 108 can surround at least a portion of the magnetic flux concentrator 1002. A portion of the magnetic flux concentrator 1002 can be positioned on the housing 1004 at a location at which a secondary inductor 112 is to be located. The magnetic flux concentrator 1002 can direct a magnetic flux, which is generated by a current flowing through the primary inductor 108, toward the secondary inductor 112. In the example depicted in FIG. 11, arrows are used to show the direction of the magnetic flux is through the magnetic flux concentrator 1002.

In additional or alternative aspects, multiple primary inductors can be included on a pusher paddle to allow for stacked product configurations. Doing so can allow power to be selectively provided to individual product packages in a manner that minimizes or otherwise reduces a radiation footprint associated with the powered shelf system.

Figure 12:
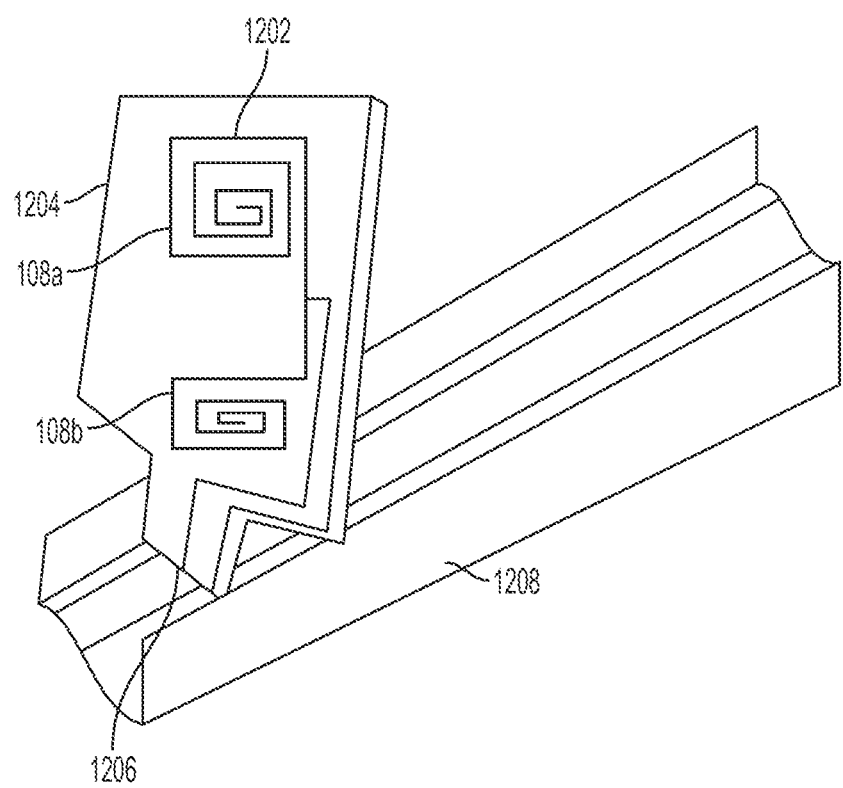
FIG. 12 is a perspective view depicting a powered shelf system having a pusher with a primary inductor array according to one aspect of the present disclosure.
Figure 13:
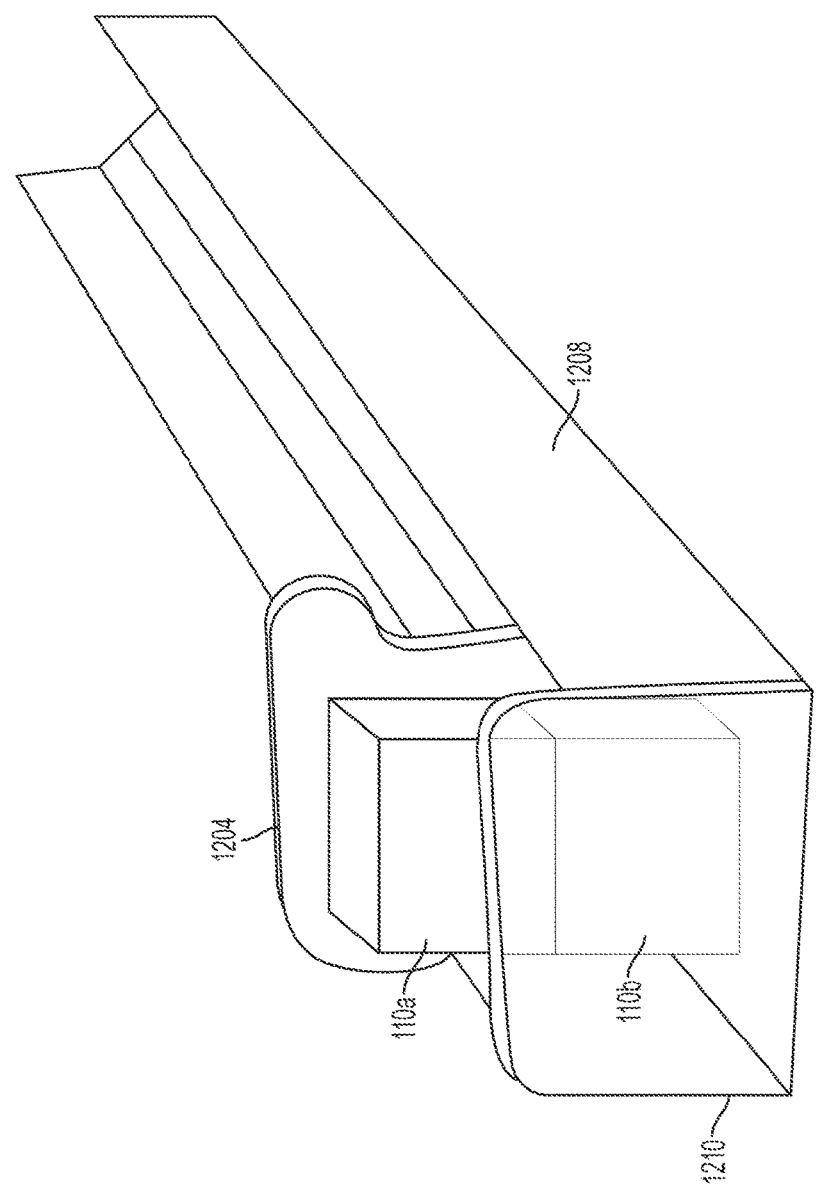
FIG. 13 is a perspective view depicting the powered shelf system of FIG. 12 with product packages positioned in a pusher tray according to one aspect of the present disclosure.

For example, FIGS. 12-13 are perspective views depicting a powered shelf system in which an inductor array 1202 is included in and/or coupled to a pusher 1204. The pusher 1204 is positioned in a housing 1208, which can include or be coupled to the housing 102 depicted in FIG. 1. In some aspects, the inductor array 1202 can include multiple primary inductors 108a, 108b, as depicted in FIG. 12. In other aspects, a single primary inductor rather than an inductor array can be included in and/or coupled to the pusher 1204. The primary inductors 108a, 108b can be electrically coupled to the controller 106 (not depicted in FIGS. 12-13) via a suitable electrical coupling, such as the wire connection 1206 depicted in FIG. 12.

As depicted in FIG. 13, multiple product packages 110a, 110b can be positioned in the housing 1208 between the pusher 1204 and a stopper 1210. In some aspects, the stopper 1210 can be a clear plate, as depicted in FIG. 13. However, any suitable structure can be used to retain the products within the housing 1208.

In some aspects, when manufacturing the system depicted in FIGS. 12-13 (e.g., using the method 600 depicted in FIG. 6), the positions of the primary inductors 108a, 108b can be selected based on characteristics of the product packages 110a, 110b to be supported by the housing 1208. For example, the positions of the primary inductors 108a, 108b, can be selected such that the primary inductors 108a, 108b are parallel to or otherwise aligned with corresponding secondary inductors (not depicted in FIGS. 12-13), which may be located on the surfaces of the product packages 110a, 110b or within the product packages 110a, 110b. A biasing component or mechanism (not depicted) can be positioned adjacent to the pusher 1204. The biasing component or mechanism can exert a force on the pusher 1204 in the direction of the stopper 1210 in a manner similar to that described above with respect to FIG. 9. The force exerted on the pusher 1204 can cause the pusher 1204 to contact the product packages 110a, 110b. The contact between the pusher 1204 and the product packages 110a, 110b can minimize the distance between the primary inductors 108a, 108b and corresponding secondary inductors. Minimizing the distance between the primary inductors 108a, 108b and the corresponding secondary inductors can increase the efficiency of the energy coupling between the primary inductors 108a, 108b and the corresponding secondary inductors.

Any suitable pusher system can be included in or otherwise used with the powered shelf system 100. For purposes of illustration, examples of pusher systems are depicted in FIGS. 14-17.

Figure 15:
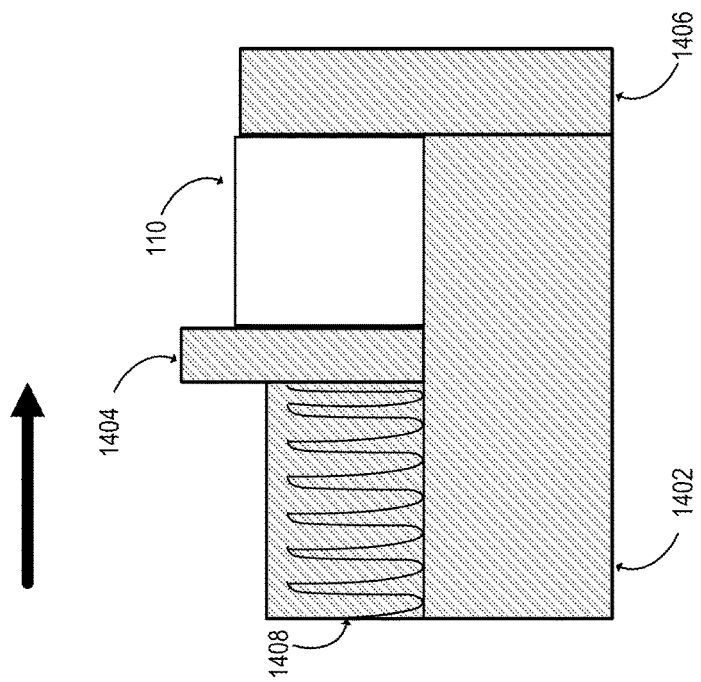
FIG. 15 is a lateral, cross-sectional view depicting the pusher system of FIG. 15 with the pusher applying a force to the product package according to one aspect of the present disclosure.
Figure 14:
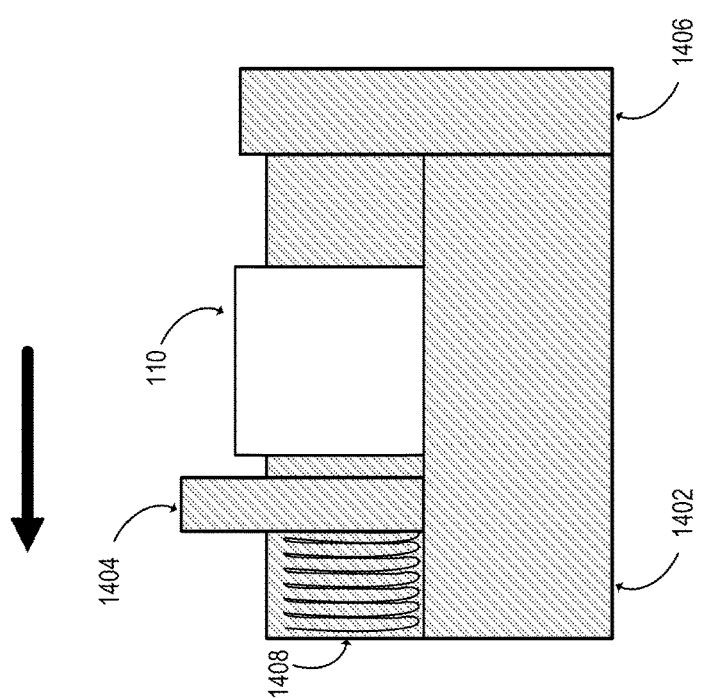
FIG. 14 is a lateral, cross-sectional view depicting an example of a pusher system that can be included in a powered shelf system according to one aspect of the present disclosure.

FIGS. 14-15 are lateral, cross-sectional views depicting an example of a pusher system that includes a housing 1402, a pusher 1404, a stopper 1406, and a spring 1408. The spring 1408 can be positioned adjacent to a portion of the pusher 1404. The product package 110 can be positioned on the housing 1402 by moving the pusher 1404 away from the stopper 1406 (depicted by the leftward arrow in FIG. 14). Moving the pusher 1404 away from the stopper 1406 can compress the spring 1408. Releasing the pusher 1404 can allow the spring 1408 to expand. Expansion of the spring 1408 can cause a force to be applied to the pusher 1404 and the product package 110 in the direction of the stopper 1406, as depicted by the rightward arrow in FIG. 14. The stopper 1406 can prevent the product package 110 from being moved off of the housing 1402 by the force applied to the pusher 1404 and the product package 110.

The implementation depicted in FIGS. 14-15 can be used with any of the aspects and examples depicted in FIGS. 1-13. In one example, the housing 1402 can include or be coupled to any of the housings 102, 1004, 1208. In another example, the pusher 1404 can be or include any of pushers 700, 902, 1204. In another example, the stopper 1406 can be or include any of stoppers 506, 906, 1210.

Figure 17:
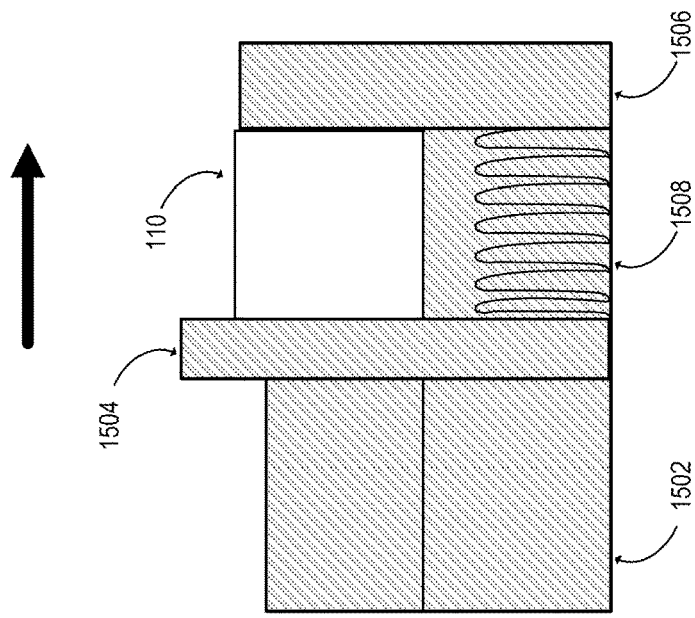
FIG. 17 is a lateral, cross-sectional view depicting the pusher system of FIG. 16 with the pusher applying a force to the product package according to one aspect of the present disclosure.
Figure 16:
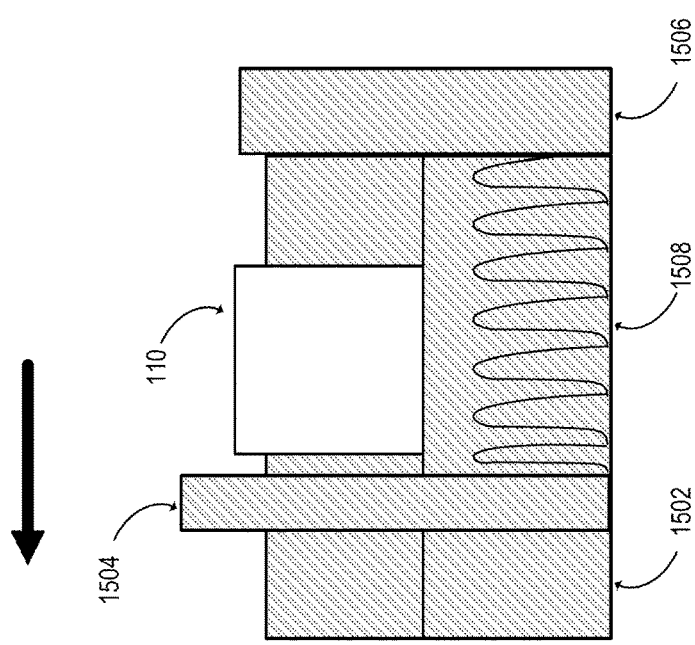
FIG. 16 is a lateral, cross-sectional view depicting another example of a pusher system that can be included in a powered shelf system according to one aspect of the present disclosure.

FIGS. 16-17 are lateral, cross-sectional views depicting an example of a pusher system that includes a housing 1502, a pusher 1504, a stopper 1506, and a spring 1508. The spring 1508 can be positioned on or within the housing 1504 adjacent to a portion of the pusher 1504. The product package 110 can be positioned on the housing 1502 by moving the pusher 1504 away from the stopper 1506 (depicted by the leftward arrow in FIG. 16). Moving the pusher 1504 away from the stopper 1506 can extend the spring 1508. Releasing the pusher 1504 can allow the spring 1508 to retract or compress. Retraction or compression of the spring 1508 can cause a force to be applied to the pusher 1504 and the product package 110 in the direction of the stopper 1506, as depicted by the rightward arrow in FIG. 17. The stopper 1506 can prevent the product package 110 from being moved off of the housing 1502 by the force applied to the pusher 1504 and the product package 110.

The implementation depicted in FIGS. 16-17 can be used with any of the aspects and examples depicted in FIGS. 1-15. In one example, the housing 1502 can include or be coupled to any of the housings 102, 1004, 1208, 1402. In another example, the pusher 1504 can be or include any of pushers 700, 902, 1204, 1404. In another example, the stopper 1506 can be or include any of stoppers 506, 906, 1210, 1406.

The foregoing description of aspects and features of the disclosure, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each example disclosed can be combined with any other example. The illustrative examples described above are given to introduce the reader to the general subject matter discussed here and are not intended to limit the scope of the disclosed concepts.

The invention claimed is:

1. A system comprising:
   a housing comprising a merchandising display shelf;
   a primary inductor coupled to or included in the housing;
   a controller electrically coupled to the primary inductor and configured for applying an electrical current to the primary inductor in accordance with a maximum power requirement for the system, wherein the electrical current is sufficient to create a magnetic field from the primary inductor having a minimum field strength at a distance from the primary inductor, wherein the minimum field strength is sufficient to induce a minimum current in a secondary inductor for powering an emitting device electrically coupled to the secondary conductor;
   a pusher system coupled to the housing and configured for positioning the secondary inductor at the distance from the primary inductor; and
   a product package displayed on the merchandising display shelf and positioned adjacent the pusher system, the product package comprising product packaging, the product packaging comprising the secondary inductor and the emitting device, wherein the emitting device is electrically coupled to the secondary inductor.

2. The system of claim 1, wherein the emitting device comprises at least one of a light-emitting diode, a sound-emitting component, and a vibration-emitting component.

3. The system of claim 1, wherein the primary inductor comprises a plurality of primary inductors, the secondary inductor comprises a plurality of secondary inductors, and the emitting device comprises a plurality of emitting devices,
   wherein the controller is configured for applying the electrical current to subsets of the plurality of primary inductors such that corresponding subsets of the emitting devices are activated in accordance with a pattern.

4. The system of claim 1, further comprising:
   a first product package having the secondary inductor and a first contact; and
   a second product package having a second contact adapted for forming an electrical connection with the first contact to allow current flow from the first product package to the second product package,
   wherein the first product package is positioned between the primary inductor and the second product package, wherein the controller is configured for detecting the presence of the first product package and the second product package based on current flow through the secondary inductor and the second product package.

5. The system of claim 1, further comprising a magnetic flux concentrator coupled to the housing and configured for focusing the magnetic flux from the primary inductor to the secondary inductor.

6. The system of claim 5, wherein the pusher system is further configured for positioning the secondary inductor adjacent to a surface of the magnetic flux concentrator that is configured to emit magnetic energy.

7. The system of claim 1, further comprising a ferrite material configured for focusing the magnetic flux from the primary inductor to the secondary inductor.

8. The system of claim 7, wherein the ferrite material is positioned on a surface of the housing adjacent to a product package that includes the secondary inductor.

9. The system of claim 7, wherein the ferrite material is positioned on a surface of a pusher from the pusher system.

10. The system of claim 1, wherein the primary inductor is included in a pusher of the pusher system, wherein the pusher is positioned such that the primary inductor contacts a product package in which the secondary inductor is included.

11. A method for manufacturing a powered shelf system for inductively coupling power from a primary inductor to a secondary inductor, the method comprising:
   identifying a minimum field strength of a magnetic field for inducing a current in the secondary inductor sufficient to power an emitting device electrically coupled to the secondary inductor;
   identifying a minimum distance between the primary inductor and secondary inductor when the primary inductor is coupled to a housing comprising a merchandizinq display shelf and the secondary inductor is included in product packaging of a product package displayed on the merchandising display shelf;
   selecting the primary inductor based on the primary inductor having at least one attribute suitable for generating the magnetic field at the minimum distance;
   installing the primary inductor in the housing and the secondary inductor in the product package; and
   coupling a pusher system to the housing that is configured for positioning the product package on the merchandising display shelf with the secondary inductor at the minimum distance from the primary inductor.

12. The method of claim 11, wherein the primary inductor is selected based on the primary inductor having an aperture sufficient to provide a magnetic flux corresponding to the minimum field strength.

13. The method of claim 11, further comprising coupling a magnetic flux concentrator to the housing that is configured for focusing the magnetic flux from the primary inductor to the secondary inductor.

14. The method of claim 11, further comprising applying a ferrite material to a surface adjacent to an area for the product package, wherein the ferrite material is adapted for focusing the magnetic flux from the primary inductor to the secondary inductor.

15. The method of claim 14, wherein the surface is a surface of the housing.

16. The method of claim 14, wherein the surface is a surface of a pusher from the pusher system.

* * * * *